US005852754A

United States Patent [19]

Schneider

[11] Patent Number: 5,852,754

[45] Date of Patent: Dec. 22, 1998

[54] PRESSURIZED HOUSING FOR SURVEILLANCE CAMERA

[75] Inventor: Peter G. Schneider, Decatur, Ga.

[73] Assignee: Videolarm, Inc., Decatur, Ga.

[21] Appl. No.: 919,021

[22] Filed: Aug. 27, 1997

[51] Int. Cl.[6] .......... G03B 29/00

[52] U.S. Cl. .......... 396/427; 348/143; 348/151

[58] Field of Search .......... 396/12, 13, 25, 396/26, 419, 427; 348/81, 143, 144, 148, 149, 151

[56] References Cited

U.S. PATENT DOCUMENTS 5,223,872 6/1993 Stiepel et al. .......... 396/427
5,394,184 2/1995 Anderson et al. .......... 348/151
5,689,304 11/1997 Jones et al. .......... 348/143 X

*Primary Examiner*—Howard B. Blankenship
*Attorney, Agent, or Firm*—James B. Middleton

[57] ABSTRACT

A housing for a surveillance camera is generally dome shaped, the camera being movable therein, and the interior of the housing is under pressure to exclude contaminants. The housing is made up of an assembly plate having a central opening to receive a lower dome therethrough, with an upper enclosure placed on top of the assembly plate. The lower dome and upper enclosure are sealed to the assembly plate to retain gas under pressure within the interior. An accessory bracket is carried by the assembly plate within the upper enclosure, and a surveillance camera is mounted from the accessory bracket. An upper dome may be placed over the upper enclosure as a sun shield. In installing the housing, a mounting bracket is first installed, then the assembly plate is carried by the mounting bracket. The lower dome is put into place, followed by the accessory bracket, the upper enclosure, and finally the upper dome. Subsequently, the interior can be pressurized by the introducing gas through the valve.

8 Claims, 2 Drawing Sheets

PRESSURIZED HOUSING FOR SURVEILLANCE CAMERA

BACKGROUND OF THE INVENTION

1. Field of the Invention

This invention relates generally to camera housings, and is more particularly concerned with a domed housing having a positive internal pressure for excluding dust, humidity and the like.

2. Discussion of the Prior Art

Domed housings for surveillance cameras have been known for some time, as shown in U.S. Pat. Nos. 4,651,144, 4,796,039, 4,920,367 and D-307,759. The domed housing is desirable due to its appearance, as well as the fact that the camera itself is not easily visible, though the camera can scan a wide area. Other housings are about the shape of the camera itself so any observer knows which direction the camera is pointing.

It is known to protect the interior of a housing by having a positive fluid pressure within the housing. For an apparatus such as a camera housing, the interior would have a positive gas pressure to exclude dust laden air, moist air or the like. Due to the construction of the domed housings, it has not been possible to seal the enclosure to hold a positive pressure.

Thus, the prior art has not provided a domed housing constructed in such manner as to retain an internal pressure.

SUMMARY OF THE INVENTION

The present invention provides a domed housing for a surveillance camera, the housing being sealed to retain a positive fluid pressure within the housing. The housing of the present invention comprises an assembly plate on which is mounted a camera and camera controls. A lower dome is received through a central opening in the assembly plate and sealed thereto, the lower dome covering the camera. An upper enclosure is received over the camera controls and is sealed against the assembly plate; and, an upper dome covers the upper enclosure to provide a sun shield that also enhances the aesthetics.

In one embodiment of the invention, a mounting bracket is provided, and the assembly plate is easily received by the mounting bracket, and the lower dome, upper enclosure and upper dome can be subsequently attached to the assembly plate. A conventional schrader valve can be used to pressurize the housing before the upper dome is put into place.

BRIEF DESCRIPTION OF THE DRAWINGS

These and other features and advantages of the present invention will become apparent from consideration of the following specification when taken in conjunction with the company drawing in which.

DETAILED DESCRIPTION OF THE EMBODIMENT

Figure 1:
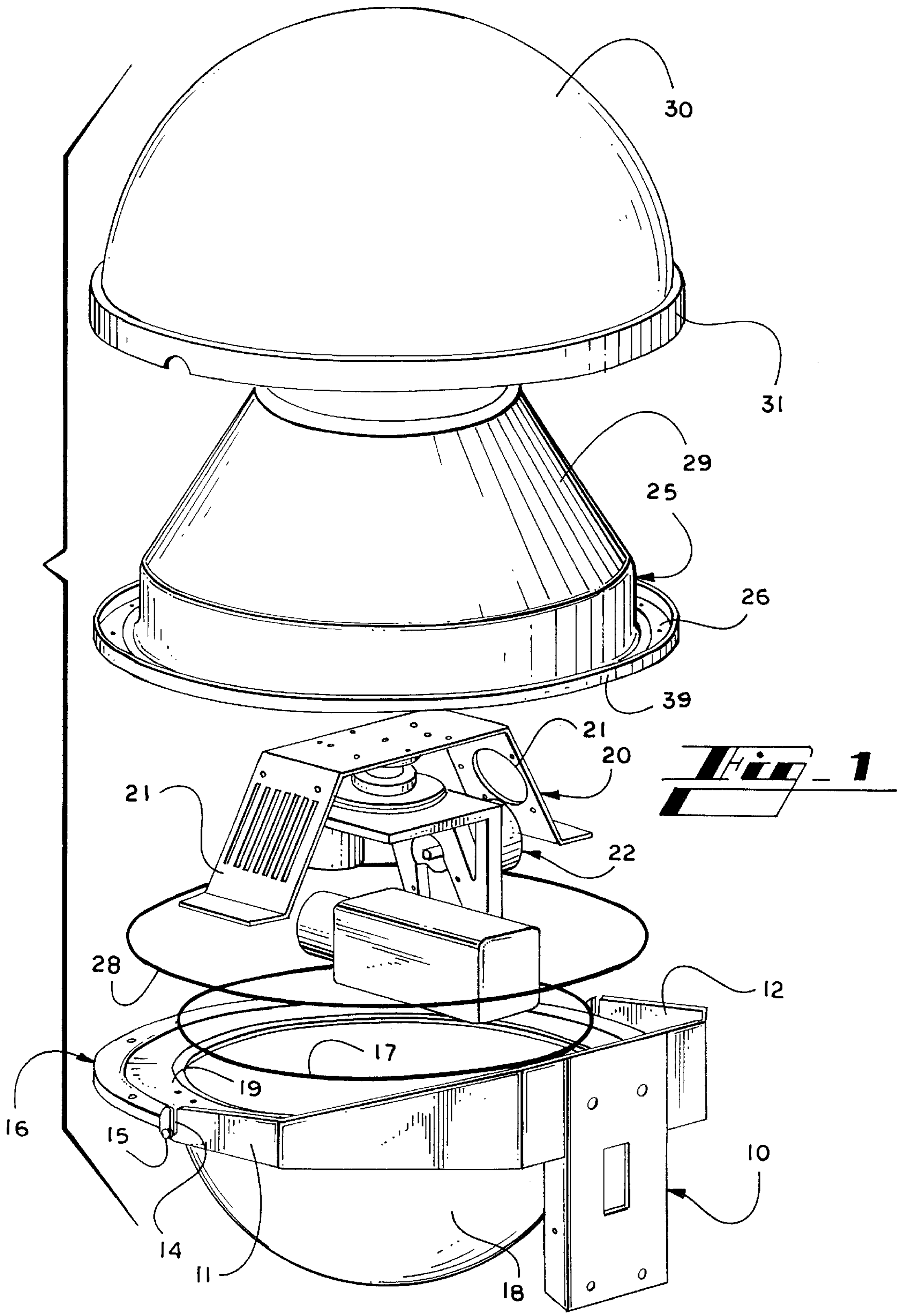
FIG. 1 is an exploded view showing a pressurized housing made in accordance with the present invention.

Referring now more particularly to the drawings, and to that embodiment of the invention here presented by way of the illustration, FIG. 1 illustrates a mounting bracket 10 for supporting the housing. The mounting bracket 10 includes a pair of arms 11 and 12 which define notches 14 to receive studs or pins 15.

The pins 15 extend generally diametrically from the assembly plate 16 for uniform support of the plate. As will be discussed in more detail below, the mounting bracket 10 also includes a plurality of flanges for supporting the assembly plate 16.

The assembly plate 16 defines a central opening for receiving a lower dome 18. The lower dome 18 is generally hemispherical, with an outwardly turned flange 19. The flange 19 is dimensioned to be received in an appropriate notch on the assembly plate 16. An O-ring 17 seals the flange 19 to the assembly plate 16.

On the upper side of the assembly plate 16 there is an accessory bracket 20. The bracket 20 is generally trapezoidal in configuration, and has its non-parallel legs 21 fixed to the assembly plate 16. The center of the bracket 20 has the camera mount 22 depending therefrom. There is generally illustrated a pan and tilt mechanism, and a video camera. These are by way of illustration only, and those skilled in the art will understand that any equipment desired can be mounted to the accessory bracket 20.

To complete the pressurized enclosure of the camera or the like, there is an upper enclosure 25 generally designated at 25. The upper enclosure includes a peripheral flange 26 which is receivable against the assembly plate 16, and is sealed by an O-ring 28. The upper enclosure 25 further includes an enclosure 29 here shown as formed by two frustoconical portions. The specific geometric shape is not particularly important, but the enclosure 29 must have sufficient volume to contain the accessory bracket 20 and any equipment mounted thereon. It is contemplated that the upper enclosure 25 will be made of metal, such as aluminum, but other materials may be equally acceptable.

To complete the housing of the present inventions there is an upper dome 30. The upper dome 30 is primarily for use as a sun shield, and to complete the appearance of the housing. As here shown, the upper dome 30 is generally hemispherical, and having an equatorial channel 31. The channel 31 acts as the supporting means for the upper dome 30, as will be discussed in more detail hereinafter.

Figure 2:
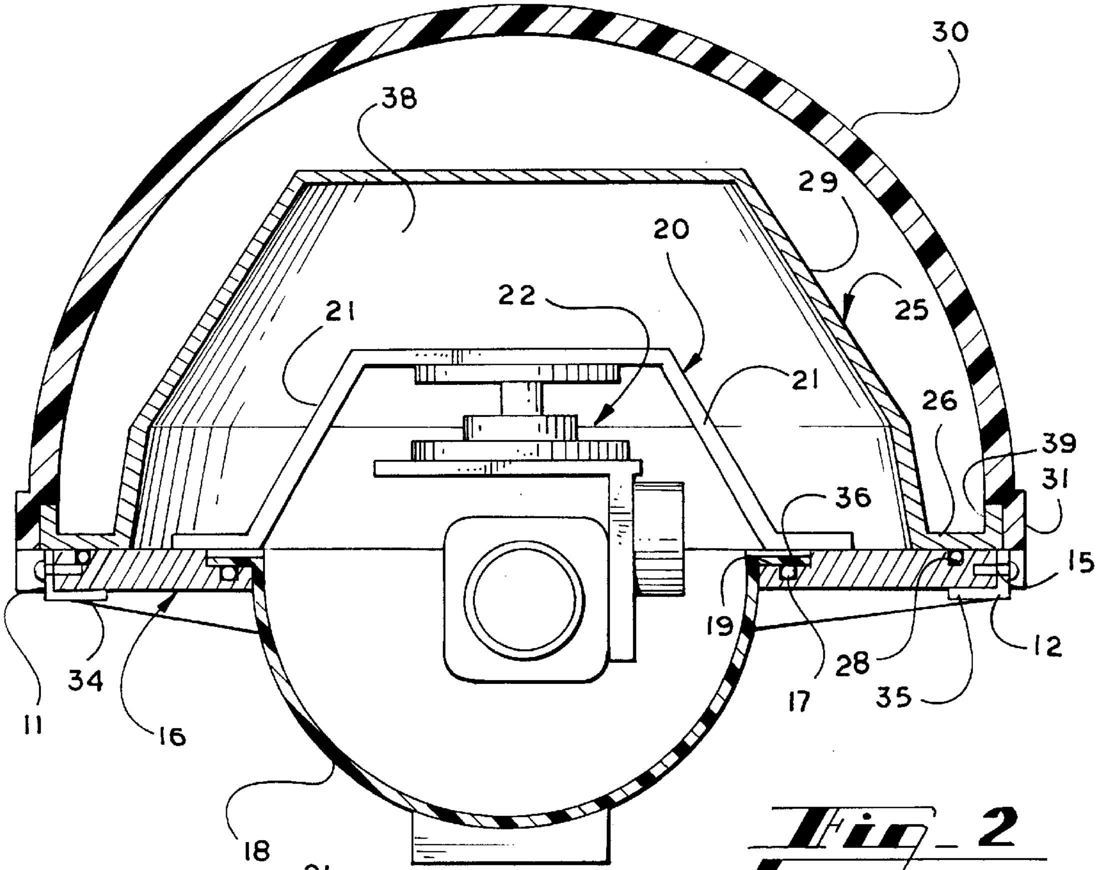
FIG. 2 is a diametrical cross-sectional view of the housing shown in Fig. 1; and, FIG. 3 is a fragmentary detail view showing the schrader valve for providing gas pressure within the housing.

For a discussion of the details of the construction of the housing of the present invention, attention is directed to FIG. 2 of the drawings. In FIG. 2 it can be seen that the assembly plate 16 is held by the arms 11 and 12 of the mounting bracket 10, and the plate 16 rests on the flanges 34 and 35. Additional flanges may be provided for better stability, but no others are illustrated here.

The lower dome 18 has an outwardly turned flange 36 that is received in the notch 19 of the assembly plate 16; and, the O-ring 17 seals the lower dome 18 with respect to the assembly plate 16. To complete the sealed housing, the upper enclosure 25 is fixed to the assembly plate 16, the flange 26 being fixed to the plate 16, with the O-ring 28 sealing the upper enclosure 25 with respect to the assembly plate 16. It will therefore be understand that the interior, within the lower dome 18 and the upper enclosure 25, is completely sealed, so the interior volume designated at 38 will retain a gas under pressure.

FIG. 2 also shows the accessory bracket 20 in position on the assembly plate 16. The camera mount 22 is shown fixed to and depending from the central portion of the accessory bracket 20.

It will be noted that the upper enclosure 25 has the outwardly turned flange 26; and, the outer end of the flange turns up, as at 39. The turned up portion 39 is received in the channel 31 of the upper dome 30 so the upper dome 30 is properly supported with respect to the upper enclosure 25.

Figure 3:
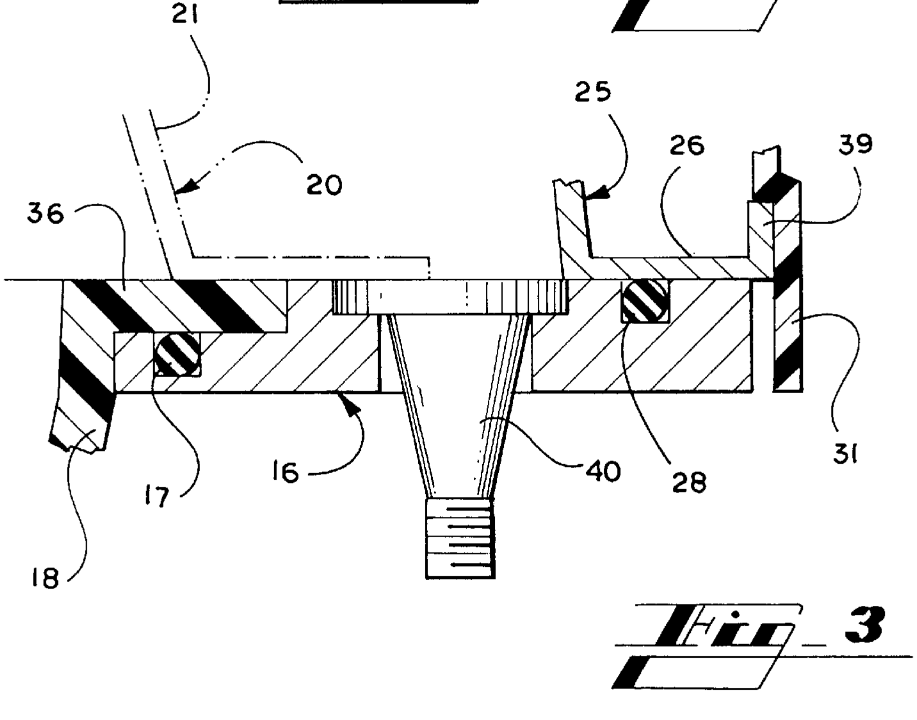

FIG. 3 of the drawings is an enlarged detail of a portion of the periphery of the assembly plate 16. The primary purpose of the figure is to show the schrader valve 40 for providing the gas under pressure to the enclosure 38. It can be seen that the valve 40 is radially outwardly of the flange 36 on the lower dome 18, and radially inwardly of the flange 26 on the upper enclosure 25. As a result, the valve 40 communicates with the interior 38. Those skilled in the art will therefore understand that a conventional hose can be used to introduce a selected gas, such as nitrogen, to the interior 38.

With the above and forgoing description in mind, it will be understood that the present invention provides a housing for a surveillance camera or the like, the housing including an assembly plate to support the entire housing, the assembly plate being receivable by a mounting bracket. With the assembly plate supported by the mounting bracket, a lower dome is placed through a central opening in the assembly plate, an accessory bracket 20 is placed on the assembly plate, carrying a camera and its controls, and as upper enclosure is placed over the accessory bracket to complete the enclosure. A valve is provided to introduce gas under pressure into the interior between the lower dome and the upper enclosure. If desired, an upper dome can cover the upper enclosure, the upper dome acting as a sun shield, and completing the aesthetic design of the housing.

Since the interior of the housing is pressurized, it will be understood that the environment is fixed, to prevent damage to the camera and its controls from dust, moisture or the like. Also, there will be no moisture condensate on the camera lens or lower dome to reduce visibility of the camera.

It will of course be understood by these skilled in the art that the particular embodiment of the invention here presented is by way of illustration only; and is meant to be in no way restrictive; therefore, numerous changes and modifications may be made, and the full use of equivalents resorted to, without departing from the spirit or scope of the invention as outlined in the appended claims.

What is claimed an invention is:

1. A housing for a surveillance camera, said housing comprising an assembly plate defining a central opening therein, a hemispherical lower dome having an outwardly turned flange, said lower dome being received within said central opening of said assembly plate with said outwardly turned flange received by said assembly plate, an upper enclosure received on said assembly plate, said upper enclosure including flanges fixed to said assembly plate radially outwardly of said lower dome, first sealing means for sealing said flange of said lower dome with respect to said assembly plate, second sealing means for sealing said flange of said upper enclosure with respect to said assembly plate, and valve means for introducing gas under pressure into an interior defined by said lower dome and said upper enclosure.

2. A housing as claimed in claim 1, and further including a mounting bracket, said mounting bracket including at least two arms, means carried by said arms for supporting said assembly plate.

3. A housing as claimed in claim 1, and further including an accessory bracket within said interior, said accessory bracket including a pair of legs fixed to said assembly plate, and means for supporting a surveillance camera from said accessory bracket.

4. A housing as claimed in claim 1, and further including an upper dome received over said upper enclosure for providing a sun shield for said housing.

5. A housing as claimed in claim 2, and further including an accessory bracket within said interior, said accessory bracket including a pair of legs fixed to said assembly plate, means for supporting a surveillance camera from said accessory bracket, and an upper dome received over said upper enclosure for providing a sun shield for said housing.

6. A method of constructing a housing for a surveillance camera, said method comprising the steps of providing a mounting bracket having a pair of arms, supporting an assembly plate on said arms of said mounting bracket, placing a lower dome through a central opening in said assembly plate so that said lower dome extends below said assembly plate, placing an accessory bracket on said assembly plate, said accessory bracket carrying a surveillance camera and controls, then placing an upper enclosure on said assembly plate covering said assembly bracket and surveillance camera.

7. A method as claimed in claim 6, and further including the steps of sealing said lower dome with respect to said assembly plate and sealing said upper enclosure with respect to said assembly plate to define an interior within said lower dome and said upper enclosure, and subsequently introducing gas under pressure into said interior.

8. A method as claimed in claim 6, and further including the step of placing a sun shield over said upper enclosure.

* * * * *